United States Patent [19]

Czarnocki

[11] Patent Number: 5,050,423
[45] Date of Patent: Sep. 24, 1991

[54] MULTI-VARIABLE SENSOR CALIBRATION

[75] Inventor: Walter S. Czarnocki, Schaumburg, Ill.

[73] Assignee: Motorola, Inc., Schaumburg, Ill.

[21] Appl. No.: 445,580

[22] Filed: Dec. 4, 1989

[51] Int. Cl.$^5$ .................. G01L 27/00; G01L 19/04
[52] U.S. Cl. .................................. 73/4 R; 73/708
[58] Field of Search .................... 73/1 R, 4 R, 708

[56] References Cited

U.S. PATENT DOCUMENTS

| 3,781,869 | 12/1973 | Sudnick et al. | 73/1 R X |
| 4,290,297 | 9/1981 | Anderson | 73/1 R |
| 4,317,126 | 2/1982 | Gragg, Jr. | 338/4 X |
| 4,414,852 | 11/1983 | McNeill | 73/1 R X |
| 4,446,527 | 5/1984 | Runyan | 73/708 X |
| 4,800,759 | 1/1989 | Hirata et al. | 73/708 |
| 4,817,022 | 3/1989 | Jornod et al. | 73/4 R X |
| 4,883,992 | 11/1989 | Koglin | 73/708 X |
| 4,926,674 | 5/1990 | Fossum et al. | 73/4 R |
| 5,012,436 | 4/1991 | Burri | 73/4 R X |

FOREIGN PATENT DOCUMENTS 122923 7/1984 Japan ........................... 73/708

Primary Examiner—Tom Noland
Attorney, Agent, or Firm—John H. Moore

[57] ABSTRACT

In a calibration circuit for calibration of the output of a differential sensor, signals adjustable in gain for calibration are summed with potentiometrically derived signals for offset calibration to provide a single ended output. Additionally, a signal dependent upon a parameter in respect of which the sensor is unwantedly dependent is summed so that the unwanted response may be compensated. This additional signal is also arranged for calibration in gain and offset so that the unwanted response is calibrated out. The range of calibration includes a null point where there is no response in respect of one parameter to permit calibration in respect of another without interaction.

1 Claim, 1 Drawing Sheet

MULTI-VARIABLE SENSOR CALIBRATION

TECHNICAL FIELD

The present invention relates to transducer calibration, and in particular to compensating circuits connected to a sensor element to provide calibration.

BACKGROUND OF THE INVENTION

A sensor element selected to provide an output signal in response to variation in a parameter will typically be responsive to other parameters giving rise to unwanted signal variations. Such unwanted variations may be compensated by providing an element sensitive predominantly to the unwanted parameter and using its output signal to subtract the unwanted effect from the sensor output so that such variations are calibrated out. The calibration procedure of many sensor types includes providing such an element.

Calibration is also normally required to provide compensation between nominally identical sensors, since typically there will be differences in the unwanted variations between sensors of the same type due to manufacturing tolerance, differences in batch materials, etc. Silicon piezo-resistor pressure sensors (PRTS), for example, exhibit a wanted pressure characteristic varying with temperature. This unwanted variation is in addition to other intrinsic features requiring calibration such as offset variation and gain variation between sensors.

A typical PRT is a four terminal device providing a differential output voltage between two terminals which increases with applied pressure, the other terminals serving as power supply connections. For a description of such a device reference may be made to U.S. Pat. No. 4,317,126 issued to Gragg. There are three principle characteristics of the device to be calibrated, offset, that is a non-zero output for the reference input magnitude, gain, that is variations in the magnitude of the output voltage between sensors at a constant input, and temperature, which manifests itself as a temperature dependent offset to be compensated by a temperature sensitive device such as a thermistor.

In PRT technology it is known to implement a calibration network in a hybrid circuit packaged together with the sensor to produce transducer components of repeatable performance.

SUMMARY OF THE INVENTION

According to the present invention, a calibration network for a sensor having an output varying in dependence upon a parameter to be measured and at least one other parameter, includes signal conditioning means arranged to receive said sensor output and to provide an output therefrom, said output being adjustable for calibration, compensating means arranged to derive a signal varying in dependence upon an unwanted parameter and to provide an output therefrom, said output being adjustable for calibration, at least one of said calibration adjustments being arranged to be over a range including a null point where the derived signal is independent of variations in one parameter to permit calibration in respect of at least one other parameter, and means for combining the output of said signal conditioning means and said compensating means to provide an output calibrated with respect to said unwanted variable.

Preferably the null is chosen such that the contribution to the output at null is zero. Advantageously this is achieved by subtractively combining contributions that are of equal magnitude. Preferably the calibration range of the compensating means includes the null point and calibration when at null in respect of the wanted parameter. For preference, the means for combining the outputs includes an operational amplifier, the combination being by current summation at operational amplifier.

In a preferred form, the compensating signal is derived from the sensor material itself, advantageously by a common mode response of a differential sensor.

BRIEF DESCRIPTION OF THE DRAWINGS

In order that features and advantages of the present invention may be further appreciated, an embodiment will now be described, with reference to the accompanying diagrammatic drawing, FIG. 1, which represents a sensor connected calibration network in accordance with the present invention.

BEST MODE FOR CARRYING OUT THE INVENTION

Figure 1:
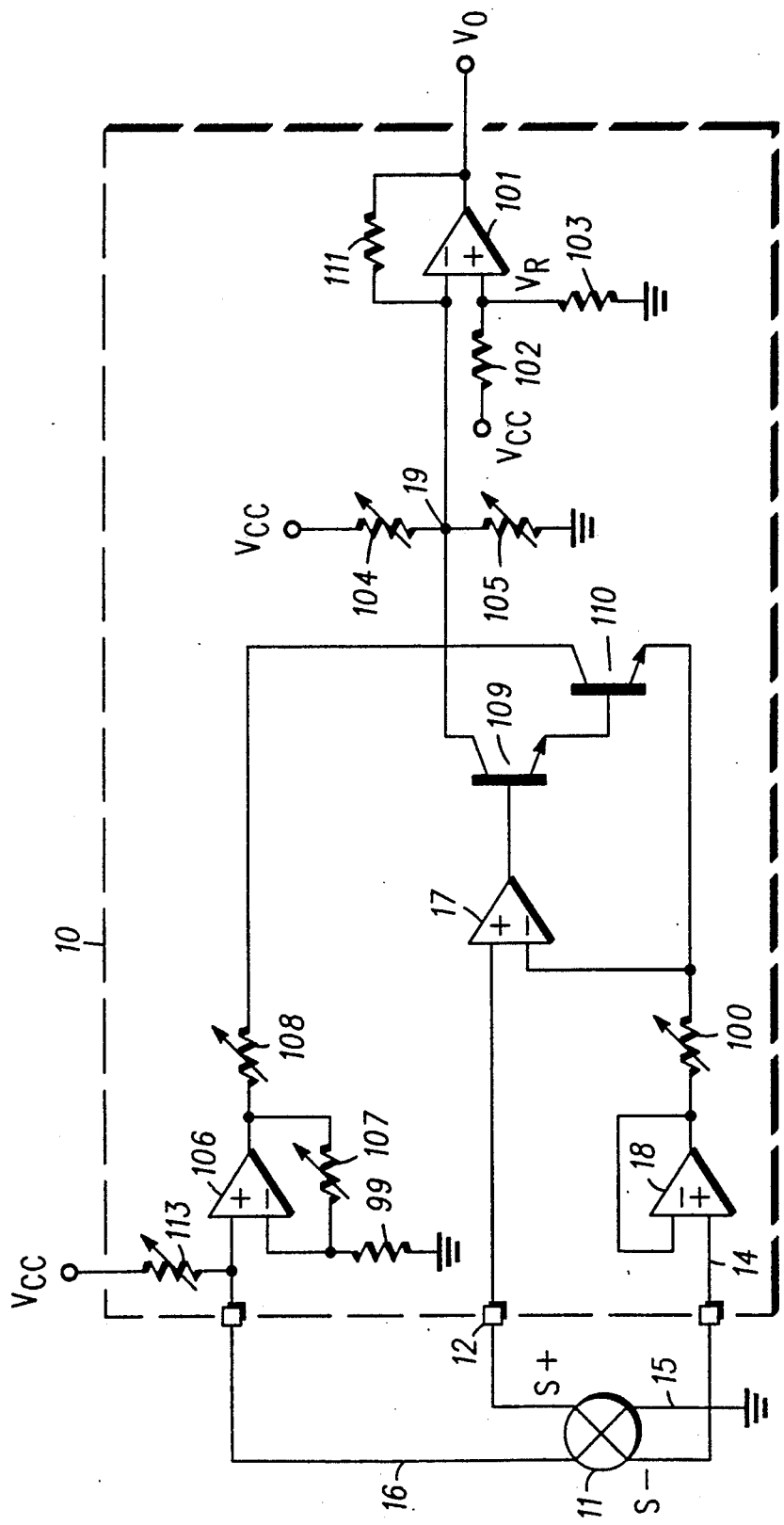

A calibration network 10 providing a calibrated output $V_0$ is connected to a sensor 11, being a four terminal PRT sensor. Power is supplied to the sensor by $V_{CC}$ and ground connections 16, 15 respectively. The sensor provides a differential output in the form of a first output S+ at terminal 12 which increases as pressure applied to the sensor is increased, and a second output S− which decreases under the same conditions. The S+ and S− outputs are respectively connected to operational amplifiers 17 and 18 arranged as voltage followers and configured as a fully differential voltage to current converter, the resultant output current ($I_o$) at the summing point is given by:

$$I_0 = (V_+ - V_-)/R_{100}$$

where, V+ is the magnitude of the first output (S+), V− is the magnitude of the second output (S−) and R100 is the value of a variable resistor 100 placed in the path of the current from amplifier 18. A Darlington pair formed by transistors 109 and 110 ensure that sufficient gain is available for accurate MIRRORING.

An overall output voltage V0 is provided by an operational amplifier 101 arranged as a current to voltage converter receiving the current $I_0$. It will be noted that the differential input has been converted to a single ended output. The non-inverting input of the amplifier 101 is maintained at a constant voltage $V_R$ being derived from the supply voltage $V_{cc}$ by a potential divider formed by resistors 102 and 103. Hence the negative feedback of the operational amplifier will maintain the summing point (inverting input) at this constant voltage $V_R$.

Additional current in either sense may be injected into the summing point by setting values of a potential divider formed by variable resistors 104 and 105 and connected at the summing point 19.

It will be appreciated that the network as thus far described is adequate to calibrate the sensor in respect of gain and offset. As demonstrated by the relationship stated above, resistor 100 may be used to scale the magnitude of $I_0$ with respect to the magnitude of $(V_+ - V_-)$, and current injection with the potentiometer formed by resistors 104 and 105 accommodates offset.

Unfortunately, the output of the PRT is temperature dependent, so that a meaningful output cannot be provided without temperature calibration. In accordance with the present invention an amplifier 106 derives a signal ($V_1$) dependent upon temperature. In the present embodiment, the temperature dependence of the sensor itself is used for derivation, that is the variation in resistance with temperature (typically 0.27%/degree C. for silicon) presented in common mode by the sensor as a whole. The variation is sensed by voltage variations across the power supply terminals 16, 15, the actual voltage applied to the input of the amplifier 106 being scaled by the ratio of resistor 99 and a variable resistor 107. Hence, a current flowing through resistor 108 and varying in accordance with the temperature dependency of the PRT is injected into the summing point 19 to compensate for the temperature dependent variations in PRT output. A gain may be applied to the output (V1) of amplifier 106 by adjustment of a variable resistor 107. It will be appreciated that if this voltage is adjusted so that $V_1 = V_R$, then no current will flow via resistor 108 and therefore the output of amplifier 106 will make no contribution to the overall output, that is then in an operating point at which the contribution of the output current of the amplifier 106 is pressure independent. Thus, at this operating point, the sensor 11 may be exercised over its pressure range to allow offset and gain calibration. Standard reference pressures used for calibration might be 59 KPa and 105 KPa. As the operating point moves away from the standard reference temperature, however, current via resistor 108 is injected to the summing point 19 by the amplifier 106 output.

The transfer function of the overall circuit is given by:

$$V_0 = \frac{R_{111}}{R^*_{100}} \cdot V_d + V_R + \frac{R_{111}}{R^*_{105}} \cdot$$

$$V_R - \frac{R_{111}}{R^*_{104}} (V_{cc} - V_R) + \frac{R_{111}}{R^*_{108}} (V_R - V_1^*)$$

wherein:
$R_{100}$ = the resistance of resistor 100, etc.,
$V_d = V_+ - V_-$ (sensor differential output voltage), and $$V_1 = \left(1 + \frac{R^*_{107}}{R_{112}}\right) \cdot V_s$$

and $$V_s = \frac{R_s}{R_s + R^*_{113}} \cdot V_{cc}$$

where $V_s$ = common mode voltage drop across sensor power supply connections and $R_s$ = prt sensor input resistance.

Variable resistances have been marked with an asterisk (*).

In common with many calibration problems, the calibration of a PRT may be considered as an intrinsic calibration to set the response of the sensor to the wanted parameter (pressure), and an external calibration to regulate the application of compensation to ensure that the response to the unwanted parameter (temperature) is calibrated out.

From the above transfer function, it will be observed that $R^*_{100}$ may be used to scale the differential response ($V_d$), that is $R^*_{100}$ provides a gain adjustment, $R_{105}^*$ and $R^*_{104}$ may be employed to adjust offset in their respective directions, and $R^*_{108}$ may be adjusted to calibrate the gain of the temperature compensation applied. Importantly, it will further be observed that $R^*_{107}$ may be used to adjust (at a chosen operating point) $V_1$ so that $V_1 = V_R$, and that in this case the effect of compensation component is removed. Hence, the pressure dependent calibrations may be carried out at this operating temperature. Moreover, since no other term is $V_1$ (and hence temperature) dependent, the adjustment do not interact.

In a typical application, a sensor might be calibrated over a pressure range from 15 to 105 $KP_a$ (applied absolute pressure) and over a temperature range from $-40$ degrees C. to $+125$ degrees. To perform the intrinsic calibration reference operating points at 59 $KP_a$ and 105 $KP_a$ at 25 degrees C. might be selected, and for temperature compensation 59 $KP_a$ at 85 degrees C. Calibration then proceeds as follows.

Firstly, resistor $R_{113}$ is adjusted for gain compensation of the sensor, that is so that the family of pressure characteristics at different temperatures have the same slope. With some sensor types, this adjustment may be achieved without measurement based upon a priori knowledge of sensor behavior.

Secondly, $R^*_{107}$ is adjusted to make $V_1 = V_R$, 25 degrees C. Maintaining these conditions, any intrinsic offset in the measured output Vo may be calibrated to the required value by adjustment of $R^*105$ or $R^*106$, which act in opposite directions. Then, to calibrate the gain of Vo at the reference temperature (25 degrees C.) measurements of Vo are taken at 59 KPa and at the increased pressure of 105 KPa, and the value of $R^*100$ is adjusted accordingly. Since at 25 degrees C. the temperature maintained per gain adjustment, $VR - V1 = 0$, the ($R111 \cdot (VR - V1)$) term present in the output Vo makes no contribution to the value of Vo; it is this pressure independence which allows successful calibration. Since VR is a fixed voltage, at an elevated temperature the value of V1 will have changed, but not that of VR. Hence, finally, $R^*108$ may be adjusted so that Vo returns to the value previously measured at the reference temperature to achieve offset calibration. Importantly, it will be noted that this adjustment does not affect the output provided at the reference temperature.

In alternative applications it may be more convenient to set the compensation for independence of the variation due to the unwanted variable and adjust the wanted variable response.

The present invention, although it may be implemented in discrete components, provides a calibration network suitable for integration. All the components of the network may be integrated, preferably with sensor drive circuits so that a calibrated transducer may be fabricated by combination of the sensor itself with a single integrated circuit. In such an arrangement, the variable resistors are preferably be of the laser trimmed thin film type.

What is claimed is:
1. A calibration network for a pressure sensor that generates an output signal whose value varies with variations in temperature, comprising:
compensating means coupled to the sensor for deriving from the sensor a temperature compensating current that is substantially pressure-independent and that has an amplitude which varies in accordance with temperature-induced variations in the sensor's output signal, the temperature compensating current being adjustable to provide a substantially zero value at a reference temperature;

signal conditioning means arranged to receive the sensor's output signal and to provide an amplified sensor current whose amplitude is adjustable;

means for generating an adjustable offset current; and means for combining the amplified sensor current with the temperature compensating current and the offset current so that, at the reference temperature, the substantially zero value of the compensating current permits the amplified sensor current and the offset current to be adjusted independently of any effect from the temperature compensating current.

* * * * *